(No Model.)

2 Sheets—Sheet 1.

E. SPILLER.
SEED PLANTER.

No. 257,899.  Patented May 16, 1882.

Witnesses:
F. M. Burnham
John W. Dunbar

Inventor:
Elisha Spiller
By Edw. Underwood
Atty (No Model.)   2 Sheets—Sheet 2.

E. SPILLER.
SEED PLANTER.

No. 257,899.   Patented May 16, 1882.

Witnesses:
F. M. Burnham
John W. Dunbar

Inventor:
Elisha Spiller
By Edward Underwood
Atty

United States Patent Office.

ELISHA SPILLER, OF ST. HELENA PARISH, LOUISIANA.

SEED-PLANTER.

SPECIFICATION forming part of Letters Patent No. 257,899, dated May 16, 1882.

Application filed January 9, 1882. (No model.)

*To all whom it may concern:*

Be it known that I, ELISHA SPILLER, a citizen of the United States, residing at St. Helena parish, in the county of St. Helena and State of Louisiana, have invented certain new and useful Improvements in Seed-Planters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in seed-planters, and especially applies to that class of planters which are used for corn, cotton-seed, pease, and other small grains which are usually planted in hills at regular distances apart; and it consists in a peculiar construction of the same, to be hereinafter described; and it further consists in combining with such seed or grain planter certain parts by which the implement used as a planter for grain in hills may be readily converted into a planter for dropping seed in drills or drilling fine fertilizers—as guano, bone-dust, or plaster—into the furrows for the grain.

It further consists in the peculiar construction of the plow, which operates both as a furrow-opener and a grain-coverer.

Figure 1:
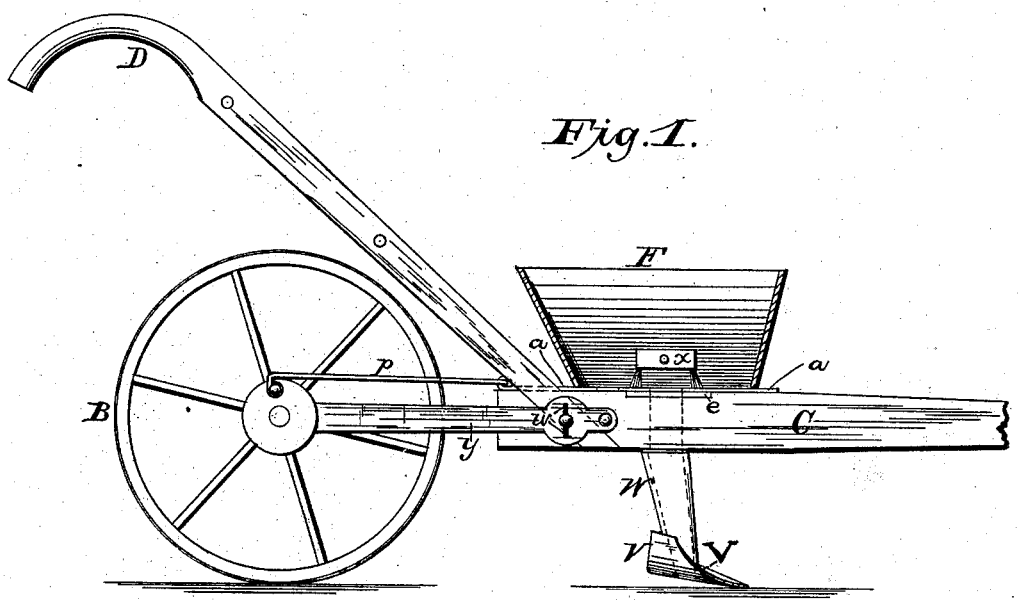
Figure 2:
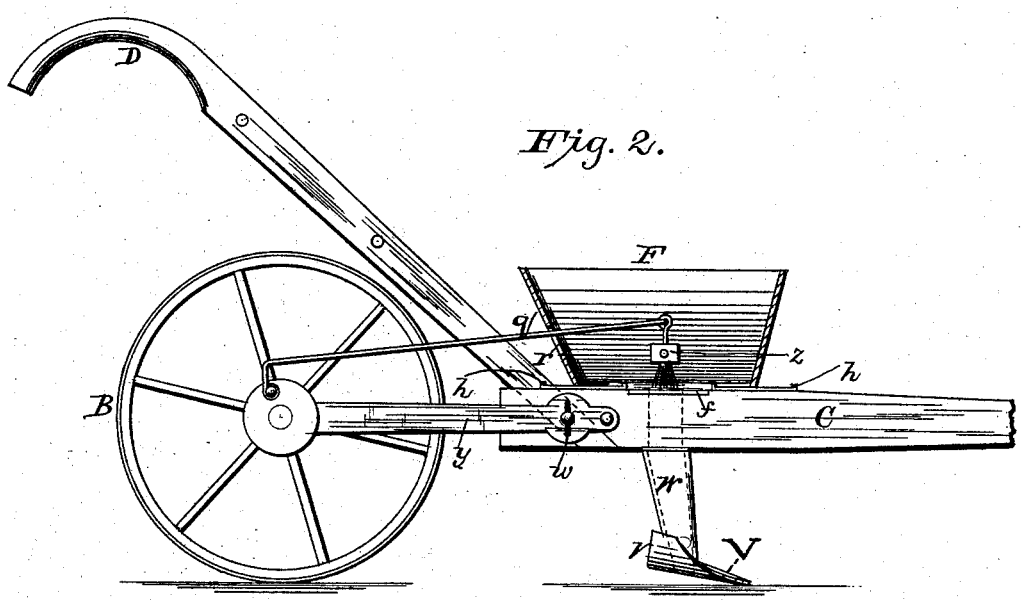
Figure 3:
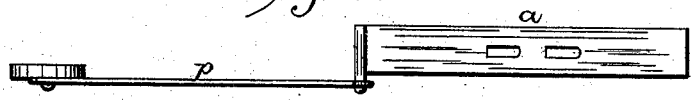
Figure 4:
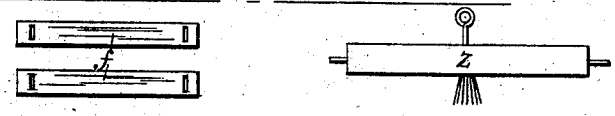
Figure 5:
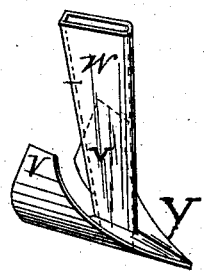

In the drawings, wherein similar parts are represented by the same letters in the several figures, Figure 1 is a view of my planter arranged to plant in hills. Fig. 2 is a view of the same arranged for drilling. Fig. 3 is a view of the slide and eccentric-rod of Fig. 1. Fig. 4 is a detailed view of the plates and spider used in drilling. Fig. 5 shows the plow and standard detached.

I construct my seed-planter provided with the usual beam, C, wheel B, handles D, and hopper F. The axle of the wheel must be in the plane of the beam, and on this axle, on the right side thereof, I place an eccentric, which, by means of its rod $p$, operates a slide in the bottom of the grain-box. The grain box or hopper is placed on the top of the beam, as usual, and working in its bottom is the slide $a$, having two openings through it to allow the passage of the grain. These openings communicate by a hole through the beam with a hollow shaft or standard, W, that carries the plow or opener, and it discharges the grain immediately behind the plow in the furrow it has made, and the wings of the plow cause the earth to be thrown back into the furrow and cover the seed. Within the hopper, and directly over the center of the slide $a$, is placed a removable brush-block, $x$, having a brush on each side thereof, which prevents the grain pressing down on the slide and clogging it. The brush-block is attached to the sides of the hopper by screws or analogous means, so as to be easily removable.

The plow V may be made separate, and attached to the standard in any usual manner; or it may be cast in one piece with the standard. It is of peculiar construction, as shown in Fig. 5, having at each side a wing, $v$, formed by the upward bending of the corners, and the opening between the wings being narrower in rear than in front causes the earth loosened and raised by the point to pass backward on each side of the foot or standard W, between the wings, into the furrow, and cover the grain just dropped through the hollow standard. The wings of the plow extend far enough behind the standard to allow the earth to cover the dropped grain, and the plow has a hollow shank, which receives the end of the standard; or the plow and standard may be cast in one piece.

Upon the beam of the planter, below the hopper and flush with the surface of the beam, is a plate of thin metal, $e$, attached by four screws, and it has a single opening through it large enough to admit the passage of the grain in one of the openings in the slide $a$, which slide works just over it, and the stationary brush $x$, as the slide moves, will cut off the supply of grain alternately. One hole in $a$ will fill with grain and pass under the brush, and as the slide moves the filled hole comes over the opening in $e$ and discharges its contents, which pass down through the beam and the hollow standard to the ground in rear of the plow, and the other hole in the slide fills as the first empties. The brush-block is a wooden or metallic plate, placed across the hopper just above the slide, having on each side brushes of bristles or fine wire, reaching down to the slide to cut off the grain therefrom. I provide three slides having different-sized openings, so that grains of different sizes may be planted in proper quantity.

The standard which carries the plow is made of cast metal, and is attached to the lower surface of the beam by screws or bolts. It is hollow, having an opening through it the size of that through the beam—usually five inches long by one inch wide.

The wheel is connected with the beam by arms Y, pivoted by pins or bolts to the outsides of the beam near the back end of the same, and bearing the ends of the axle at the rear. Vertical slots $w$ in these arms, a short distance from the pivot, receive the ends of pins in the sides of the beam, so that the plow has a vertical play of several inches without raising the wheel from the ground. The handles are attached to the beam in mortises or side cuts, so that they are flush with the outsides of the beam and allow the arms Y to pass over them without obstruction.

The slide $a$ is operated by an eccentric-rod, $p$, connected with the eccentric on the wheel B. This rod hooks into a projection on the rear end of the slide $a$, and can be easily detached for the purpose of changing or removing the slide.

The operation of the machine is as follows: The revolution of the wheel B causes a movement of the eccentric and rod, which communicates an alternate or reciprocating motion to the slide $a$, and as the holes in the slide pass out from under the brush each in turn fills with seed, and as it returns will discharge its contents through the opening in plate $e$ into the hollow in the standard W, by which it is deposited in the furrow made by the plow, and immediately in rear of the same, and the continuous stream of loose earth passing between the wings of the plow will cover each hill of grain.

To change the hill-planter to a drill-planter, remove the brush-block from the hopper, also the slide $a$, and unscrew the plate $e$. Now the opening through the beam will be found to be a mortise five inches long by one inch wide, which is the size of the opening through the foot or standard. Over this opening place, in lieu of plate $e$, the two narrow plates $f$, of the same length as the plate $e$, and attached in like manner, except that the openings to receive the screws are slotted to allow the plates to be brought nearer together or farther apart, as the size of the grain demands; and where the brush-block was place the spider $z$, consisting of a plate of wood or metal, having spindles at the ends to fit into the sides of the hopper, wherein openings are made to receive them, and projecting from its lower face five or more fingers of stiff wire, and on its upper face a pin or projection, with a ring at top to attach the eccentric-rod. A longer eccentric-rod, $q$, is then attached by being passed through the opening $r$ in the end of the hopper and hooked into the ring, and as the spider is moved by the rod $q$ its fingers will play back and forth through the grain and prevent the opening between the plates $f$ from becoming clogged or obstructed from the pressure of the grain, and the seed or fertilizer will be passed in a continuous stream down the standard to the furrow in rear of the plow and be covered, as above described. When not in use the opening between the plates $f$ is covered by temporary slides $h$, which draw outward and open the slot between the plates $f$.

Having thus fully described my invention, what I claim as new therein, and desire to secure by Letters Patent, is—

In a seed-planter for planting seed in drills, the combination of beam C, wheel B, eccentric and rod $q$, handles D, hollow standard W, slotted arms Y, plow V, adjustable plates $f$, and spider $z$, all as described, and for the purposes specified.

In testimony whereof I affix my signature in presence of two witnesses.

ELISHA SPILLER.

Witnesses:
F. M. BANKSTON,
C. G. HONEYE.